United States Patent [19]

Tait

[11] Patent Number: 4,735,431
[45] Date of Patent: Apr. 5, 1988

[54] WHEELCHAIR

[76] Inventor: Robert E. Tait, 26 Dedwood Ter., Ponsonby, Auckland, New Zealand

[21] Appl. No.: 778,071

[22] Filed: Sep. 20, 1985

[51] Int. Cl.$^4$ .............................................. B62M 1/16
[52] U.S. Cl. .............................. 280/242 WC; 280/246
[58] Field of Search ........... 280/242 WC, 242 R, 243, 280/244, 246; 74/142, 143, 144

[56] References Cited

U.S. PATENT DOCUMENTS

| | | | |
|---|---|---|---|
| 3,869,146 | 3/1975 | Bulmer | 280/242 WC |
| 4,358,126 | 11/1982 | Mitchell et al. | 280/242 WC |
| 4,503,724 | 3/1985 | Ward | 280/242 WC X |
| 4,506,900 | 3/1985 | Korosue | 280/242 WC |
| 4,560,181 | 12/1985 | Herron | 280/244 X |

FOREIGN PATENT DOCUMENTS 2227851 11/1974 France ........................ 280/242 WC Primary Examiner—John J. Love
Assistant Examiner—Mitchell J. Hill
Attorney, Agent, or Firm—Young & Thompson

[57] ABSTRACT

A wheelchair is propelled by movement of a pair of normally horizontal handles which are pivotally mounted on either side of the chair. Up and down movement of the levers drives a clutch which in turn is connected to the driven wheels for propulsion. The up and down motion of the levers allows the occupant to use their weight to assist propulsion as well as partially and intermittently relieving the ischial tuberosities of weight bearing.

8 Claims, 5 Drawing Sheets

WHEELCHAIR

BACKGROUND OF THE INVENTION

This invention relates to wheelchair propulsion means and has particular application to the construction of wheelchairs or to the provision of a sub-frame containing the propulsion means so that it can be fitted to existing wheelchairs.

In the past, wheelchairs have had three main forms of propulsion. These are: Pushing from behind by a nurse or other assistant; Direct operation on the large diameter main wheels; and Electric drive.

The first involves the use of another person, and is impossible when the user is alone and left to fend for himself. The second requires the user to grip the top of the wheel, or the top part of a secondary rim attached around the outside of the wheel, by pulling and pushing it forward. This can require quite a considerable amount of exertion by the arm muscles in a direction and position that is not ergonomically efficient. The third is expensive, renders the wheelchair somewhat heavy, and sometimes leads to difficulties in terms of manoeuverability.

DESCRIPTION OF THE RELATED ART

Attempts have been made to provide a lever action operating directly on the wheel or secondary rim of the wheel, or coupled to the wheel by a chain drive. Examples of such wheelchairs include:

Petersen U.S. Pat. No. 3,189,368 issued 1965,
Barroza U.S. Pat. No. 3,877,725 issued 1975, and
Schaeffer U.S. Pat. No. 3,994,509 issued 1976.

These however all involve a backwards and forwards motion of the lever (i.e. pulling or pushing the lever) similar to the pulling and pushing on the wheelrim of conventional wheelchairs. This backwards and forwards motion results in oscillating shear forces on the buttock tissues. Users thus can often suffer from pressure sores and from decubitus ulcers.

It is an object of the present invention to provide improved propulsion means for a wheelchair or the like, or one which will at least provide the public with a useful choice.

SUMMARY OF THE INVENTION

Accordingly, in a first aspect, the present invention broadly consists in propulsion means for a wheelchair or the like having a frame supported by wheels, wherein said propulsion means includes: at least one handle operatively connected to at least one driven wheel of the wheelchair, and pivoted substantially at the level of an occupant's hip joint in use, whereby in use said handle is capable of being manually moved up-and-down by an occupant of the wheelchair to impart a driving force to said at least one driven wheel to propel the wheelchair.

By using an up-and-down movement on the handle, the reaction force can be supplied by the user's body weight, and with each push a proportion of the body weight can be transferred from the buttocks to the hands. The vertical reaction force thus acts to partially and intermittently relieve the ischial tuberosities of weight bearing, whilst minimising the risk of shear stresses being applied to the buttock tissues.

Preferably, the propulsion means is applied to a wheelchair.

Alternatively, the propulsion means is applied to a standing frame, adapted to convey an occupant in a standing position.

Preferably, there are two pivotally mounted levers one on each side of the frame, each adapted to move in an arc from a position above the horizontal to a position below the horizontal so that a user can apply force in a downwards direction.

Preferably there is a positive forward drive transmission between each said lever and its respective driven wheel.

Preferably, each said lever includes a manually operable gripping mechanism for gripping and releasing a drive wheel.

BRIEF DESCRIPTION OF THE DRAWINGS

The above gives a broad description of the present invention, a preferred form of which will now be described by way of example only with reference to the accompanying drawings in which.

DETAILED DESCRIPTION OF THE INVENTION

Figure 1:
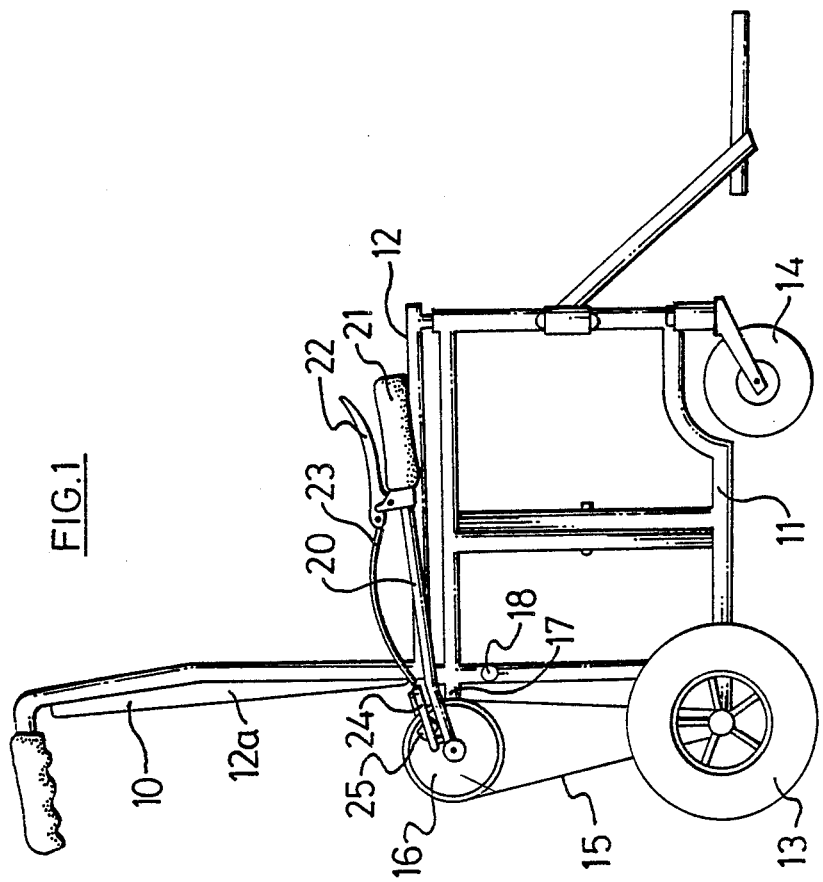
FIG. 1 is a side view of a first wheelchair of the present invention.
Figure 2:
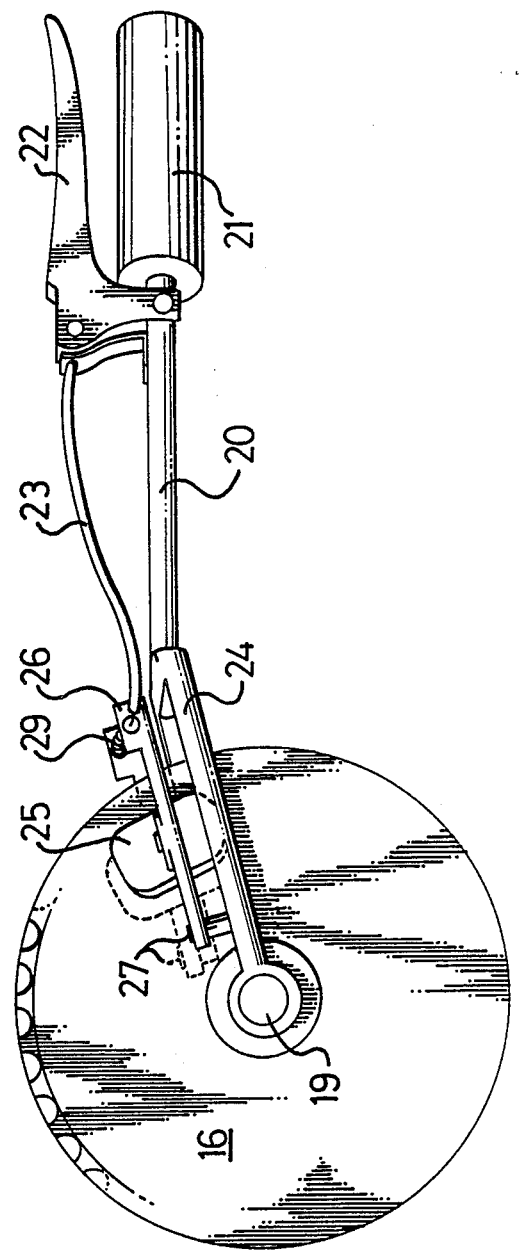
FIG. 2 is a detailed view of part of the wheelchair of FIG. 1.

FIGS. 1 and 2 of the drawings show a wheelchair 10 comprising a carriage or frame 11, typically of metal tubing with an outside diameter of 20 mm, and including a seat 12, and an upstanding seat back 12a, the frame 11 being supported on a pair of rear, driven wheels 13 and front, castor wheels 14. Each driven wheel 13 is connected via a chain or belt drive 15 with a drive wheel, or sprocket, 16 at the rear of the frame. A lever 20 is pivotally mounted at 19 adjacent each drive wheel, and extends forwardly, so that a handle 21 at its free end is beside the seat 12.

Preferably the lever 21 and the drive wheel 16 are both freely mounted on a shaft 19.

An auxiliary control lever 22 beside the handle 21 is connected via a Bowden cable 23 with a brake caliper 24. The brake pads 25 are arranged to grip the drive wheel 16 whenever the lever 22 is gripped. The control lever 22 may be adjustable so as to be moved axially along the lever 21. The brake caliper 24 preferably has a pair of brake arms 26 each of which is pivotally mounted on pins 27 on the yoke of the lever. A compression spring 29 biasses the brake arms into the released position.

Typically, the brake pads are made of polyurethane, which combines good abrasion resistance with a high coefficient of friction. The drive wheel or sprocket 16 may comprise a hard anodised aluminum disc to provide good heat dissipation. Many other materials may be used instead, however.

The driven wheels 13 are typically "Junior B.M.X" type wheels, 32 cm in diameter. Wide section pneumatic tyres of this kind give a smooth ride, and allow for the wheelchair to be used on grass and other soft or uneven surfaces. The use of relatively small wheels allows this wheelchair to have a shorter overall length even though it has the same wheelbase as a convential large wheel wheelchair. Thus the smaller diameter wheels allows this wheelchair to have a better turning circle and be more manoeuvrable then conventional wheelchairs. The smaller diameter wheels also enable the wheels to be mounted on a sub-frame which can be connected to the rear of the wheelchair.

Preferably, the wheels are arranged to be removed easily, typically by operation of a single fastening so that, in the event of a puncture, a spare wheel can be fitted with a minimum of fuss. A spare wheel can easily be carried on the wheelchair, under the seat for example, since the preferred wheels are not too large to store there.

In use, the occupant of the wheelchair holds the handles 21 in his or her hands, and moves them up and down, preferably in unison. Each time the levers 20 are thereby pushed down he or she grips the levers 22 so that the pads grip the drive wheels 16, and a driving force is thereby imparted to the ground wheels 13. Then, as the levers 20 are brought back up again, the levers 22 are released, so that there is no longer a connection between the brake pads 25 and the wheels 16.

To stop the wheelchair, the occupant merely grips the levers 22 and holds them. If the wheelchair is travelling fast with a lot of momentum, the worst that can happen to the occupant is that the levers swing downwardly to their lowest position, defined by stops 18, and stay there. The handles 21 are unlikely to be jerked out of the user's hands. (If desired, a seat belt may be provided to prevent the occupant from being pitched out of the chair.) There may be a brake release mechanism associated with the stops 18 so that, if the braking force is too great, the brakes will be released automatically. This could act to prevent the wheelchair from capsizing or skidding as a result of trying to stop too suddenly.

To steer the wheelchair, the occupant merely works one lever through a smaller arc than the other. Very tight turns can be achieved by working one lever backwards (which is to say, by gripping the lever 22 on the upward stroke instead of the downward stroke). The wheelchair can be driven backwards by operating both levers backwards.

The forward driving force is imparted on the downward stroke of the levers 20, and virtually no force is required for the upward stroke, indeed light springs could be used to return the levers 20 to the upper position. This means that the occupant can put his or her weight into propelling the wheelchair forwards, and need not rely entirely on using the arm muscles. The arrangement is, therefore, ergonomically more efficient than the direct wheel operation or the back-and-forth lever operation described above. Thus the operator can produce more output torque with less overall effort. This will enable the wheelchair user to negotiate steeper ramps than hitherto possible. Also, the braking mechanism allows the user to control the wheelchair's descent down slopes.

As a result of applying a downward force to drive the wheelchair one tends to lift oneself off the seat. This can have a beneficial side-effect in the relief or prevention of pressure sores on the buttocks, which result from prolonged resting of one's weight on the seat. In addition, the use of downward force, instead of the forward and backward pushing or pulling required for prior art wheelchairs, means that there are no shear forces on the buttock tissues. This fact will also contribute to a reduced incidence of decubitus ulcers.

Use of the wheelchair also exercises the arm muscles in exactly the same mode that is required for lifting oneself into and out of the wheelchair, or for using calipers and crutches. Consequently, one becomes better able to help oneself rather than to have to rely on the assistance of others.

The wheelchair of the present invention can be made smaller and lighter than prior art wheelchairs, which require larger drive wheels. This improves the handling and manoeuverability of the chair, and also makes it easier to be handled by an attendant.

By moving the control lever 22, e.g. sliding it along lever 20 towards the drive wheel 16 the operator can achieve a direct and effective form of change in velocity ratio, or "gear change". This mode of operation would be used for cruising at moderate or high speed along a thoroughfare or the like. The shorter the effective lever arm (ie. the distance between the pivot point 19 and the user's hand on the control lever 22) the higher the "gearing".

Figure 3:
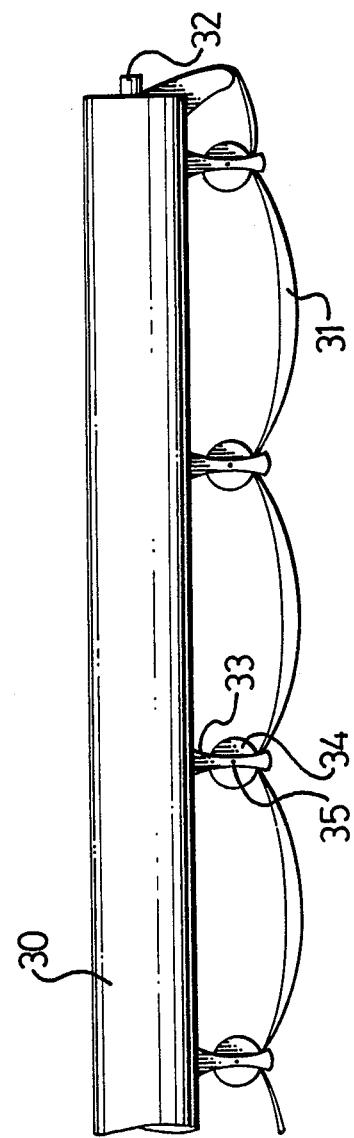
FIG. 3 is a detailed view of part of an alternative lever for use with the invention.

Instead of moving the control lever 22 along the lever 20, a different lever 30 could be used as shown in FIG. 3. This has a flexible cord or web 31 secured at anchor 32 at the free end of the lever and it passes over a series of fret like projections 33. The other end of the web is attached to the brake mechanism. The projections may each comprise a plastic bush 34 rotatably mounted over a pin 35, so that the web can slide freely over the projections.

Thus the user can grip the lever 30 at any convenient position between projections 33. By squeezing the web against the lever, the brake mechanism can be operated, and thus the user can effectively "change gear" by moving his or her hand along the lever 30 to a different position.

Figure 4:
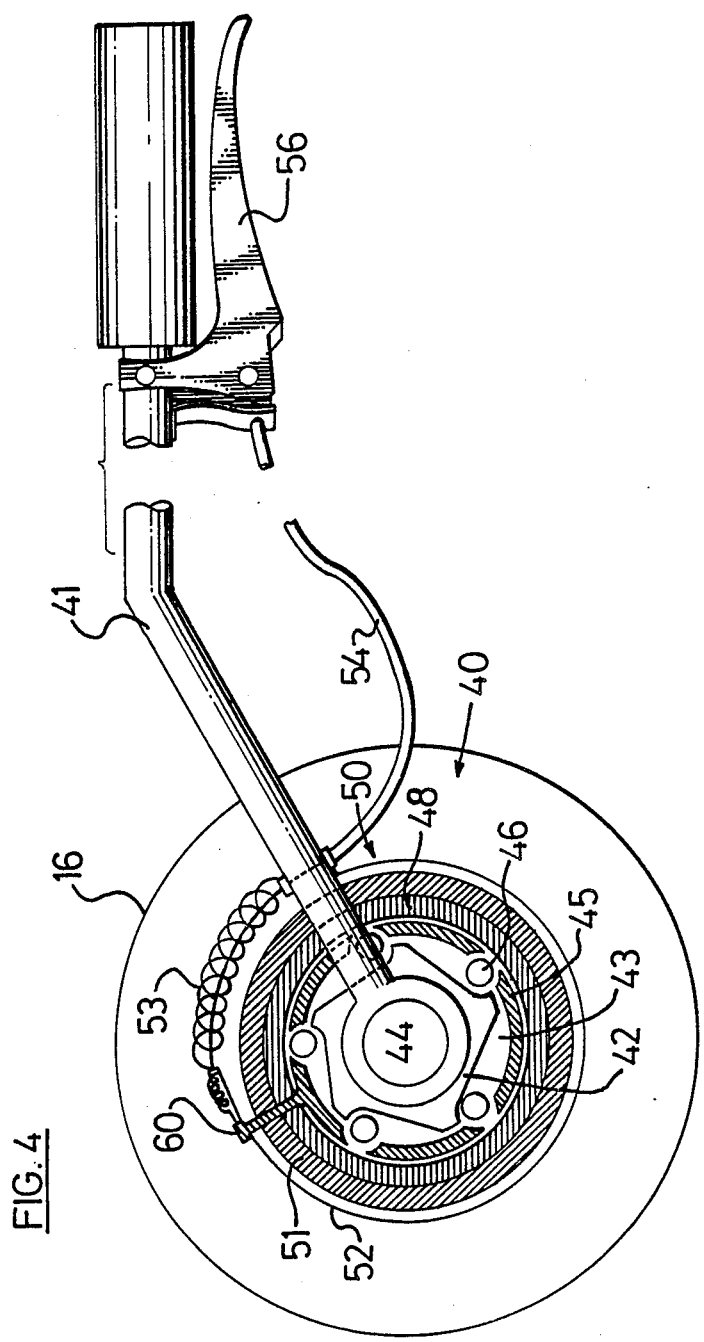
FIG. 4 is a detailed side view of an alternative propulsion means of this invention, showing a part sectional view of a roller clutch and a band brake.
Figure 5:
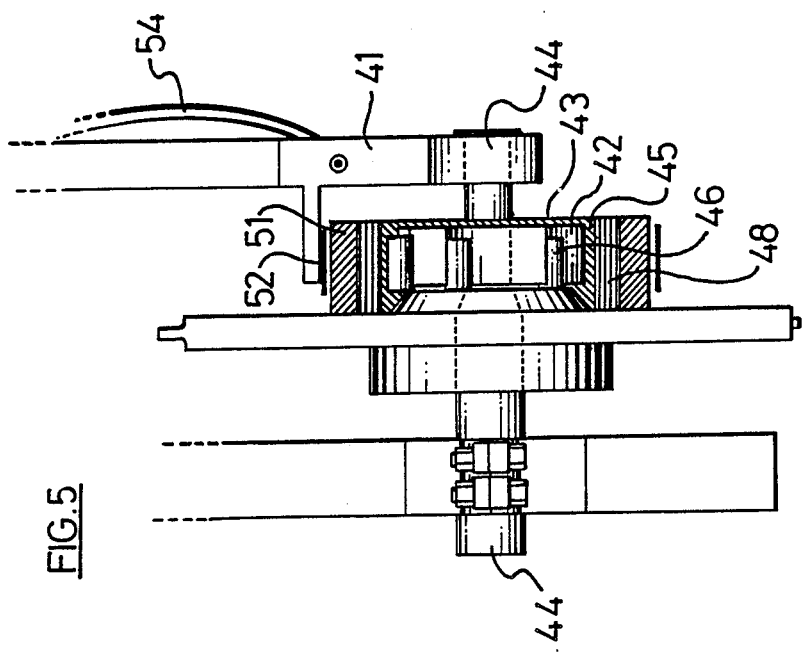
FIG. 5 is a top plan view of the mechanism of FIG. 4 showing a part sectional view of the roller clutch and band brake.

FIGS. 4 and 5 show a positive forward drive arrangement which combines a roller clutch with a band brake. The arrangement 40 can be mounted on the drive disks 16 in place of the friction drive of FIGS. 1 and 2.

A lever 41 is connected to a cam 42 of a roller clutch 43. The roller clutch is mounted on axle 44 which supports the drive disc 16.

The roller clutch 43 has a cage 45 which locates the drive rollers 46 within a drive drum 48 which is fixed to the drive wheel 16. This drive drum provides a suitable mounting for a band brake 50.

A brake lining 51 is fixed to the outer cylindrical surface of the drive drum 48 and is surrounded by a band 52 connected to main lever 41. The band is held in the released position by a compression spring 53. A Bowden cable 54 operated by a control lever 56 enables the band to be tightened around the drum and provide braking between the drive disc 16 and the main lever 41. Preferably the clutch 43 includes a neutral mechanism. This is conveniently achieved by lever 60 which projects from the roller cage 45 and is also operated by cable 54.

When the control lever 56 is operated the band brake effects frictional engagement between the main lever 41 and the drive disc 16 via the brake lining 51. At the same time, the rollers are moved into the neutral position by movement of the lever 60. Thus the main handle 41 can be used for either braking or for reverse drive.

Without operating the control lever 56, an up-and-down movement of main lever 41 will cause the roller clutch to impart a positive forward drive to the drive wheel 16 and hence via the drive transmission to the driven wheel 13 of the wheelchair.

The control lever 56 can be arranged so as to move along the lever 41 as previously described with reference to lever 22. This has the advantage that the user can quickly operate the brake without having to move his or her hand to the location of lever 56 if it is in a fixed location. Nevertheless, the positive drive arrangement of FIG. 4 does allow the user to operate the lever 41 for forward drive without recourse to the control lever 56, and thus lever 56 could be fixed at the end of lever 41 if desired.

Various modifications may be made to the above without departing from the scope of the present invention as broadly defined or envisaged. For example, the cables 23, 54 could be replaced by a rod, or a hydraulic (or pneumatic) link, or any other mechanism.

The disc brake and band brake mechanisms described could be replaced by a drum brake or other brake arrangement. Alternatively, the brake arrangement of FIG. 2 or the roller clutch of FIG. 4 could be replaced by a ratchet, or other reversible one-way clutch mechanisms, for imparting drive to the drive wheels upon operation of the levers. Preferably, the ratchets can be reversed or disengaged by operation of a manual control at the handle end of each lever.

The wheelchair may be provided with a parking brake, to hold the chair still while the operator is climbing into and out of it for example. This could take the form of a separate control for the same brakes 24 (or 50) or a holder for holding the control levers 22 or 56 in position to hold the brakes on, or it could comprise a completely separate mechanism.

Any one of many different kinds of drive mechanism could be used to replace the chain or belt drive 15. A variable gearing mechanism could be incorporated into the drive mechanism, so that the user can "change gear" to make more efficient use of his or her effort. Gear changes would, preferably, be operated from the handle ends of the levers 20 (or 41) so that the operator need not let go of the ends of the levers.

The drive could, if desired, be imparted to front or other wheels, instead of to the rear wheels as described.

In general, however, the main gear ratio would be set by selection of appropriate sprocket sizes in the chain drive, and a gear change can be effected simply by changing the position of one's hands on the levers, as described above with reference to FIG. 3.

For wheelchair occupants who have the use of only one arm, a version of the wheelchair could be produced with only one drive lever. Either the lever could be connected to both drive wheels, with a differential gear if necessary, or there could be a single drive wheel, preferably centrally located. Steering could be effected by moving the lever from side to side to turn the drive wheel(s). Alternatively, where the occupant is a hemiplegic for example, steering could be operated by a foot control.

The invention can be applied to vehicles other than wheelchairs. For example, the vehicle could be a standing frame (that is, a vehicle with no seat, or perhaps a seat which can be moved out of the way, so that the occupant can stand).

If desired, the propulsion system of the present invention could be supplied as a conversion kit for replacing the drive wheels on prior art wheelchairs. This conveniently takes the form of a pair of subframes 17 (one of which is shown in FIG. 1), each of which can be attached to the rear of an existing wheelchair frame. Such a sub-frame 17 consists of a short length of tubing for attachment to the vertical rearmost frame member of an existing wheelchair. The lever 20 (or 41), drive wheel 16, transmission 15, and driven wheel 13, are all mounted thereon. Thus an existing wheelchair can be readily converted to the wheelchair of this invention by replacing the existing drive wheels with the driven wheels 13, the attachment of the sub-frames to the wheelchair, and linking the drive wheels 16 to the driven wheels 13 using each transmission 15.

I claim:

1. Propulsion means for a wheelchair or the like having a frame supported by wheels, a seat positioned on the wheelchair and having an upper seating surface and an upstanding seat back, wherein said propulsion means includes: at least one handle operatively connected by drive means to at least one driven wheel of the wheelchair, said at least one driven wheel having a first horizontal axis of rotation, means pivotally mounting said handle on said frame for vertical swinging movement about a second horizontal axis spaced above said first axis of rotation substantially at the level of the upper seating surface, said second horizontal axis mounted to the rear of said upstanding seat back, said at least one handle extending substantially horizontally forwardly from said second horizontal axis, said drive means comprising means drivingly interconnecting the rear end of said handle and said at least one driven wheel and adapted to convert oscillatory movement of said handle into unidirectional rotation of said at least one driven wheel, whereby in use said handle is manually moved up-and-down by an occupant of the wheelchair to impart a driving force to said at least one driven wheel to propel the wheelchair.

2. Propulsion means for a wheelchair or the like, as claimed in claim 1, wherein said at least one handle comprises a pair of levers, each lever being pivotally mounted so that in use the lever can move in an arc from a position above the level of the upper seating surface to a position below the level of the upper seating surface; each said lever being operatively connected to a respective one of a pair of said driven wheels by a respective drive transmission.

3. Propulsion means for a wheelchair or the like, as claimed in claim 2, wherein each said drive transmission includes a drive wheel associated with its respective lever.

4. Propulsion means for a wheelchair or the like, as claimed in claim 3 wherein each said drive transmission includes a clutch between said lever and said driven wheel.

5. Propulsion means for a wheelchair or the like, as claimed in claim 4, wherein said clutch includes a roller clutch.

6. Propulsion means for a wheelchair or the like, as claimed in claim 5, wherein said clutch includes a brake between said lever and said drive wheel.

7. Propulsion means for a wheelchair or the like, as claimed in claim 6, wherein said brake can be operated by a control mounted on said handle.

8. Propulsion means for a wheelchair or the like, as claimed in claim 1, wherein said propulsion means is mounted on at least one sub-frame attachable to the frame of a wheelchair so that said at least one sub-frame can provide at least one said handle.

* * * * *